AMPLITUDE LIMITER BRIDGE WITH CONJUGATE SIGNAL INPUT AND LIMITED OUTPUT

Filed Sept. 23, 1960 2 Sheets-Sheet 1

INVENTOR.
HAROLD B. COLLINS, JR.
BY Fordyce A. Bothwell
ATTORNEY

INVENTOR.
HAROLD B. COLLINS, JR.
BY
Fordyce A. Bothwell
ATTORNEY

United States Patent Office 3,068,419

Patented Dec. 11, 1962

3,068,419

AMPLITUDE LIMITER BRIDGE WITH CONJUGATE SIGNAL INPUT AND LIMITED OUTPUT

Harold B. Collins, Jr., Wayne, Pa., assignor, by mesne assignments, to Philco Corporation, Philadelphia, Pa., a corporation of Delaware Filed Sept. 23, 1960, Ser. No. 58,054
18 Claims. (Cl. 328—171)

This invention relates to amplitude limiting of signals containing undesired amplitude modulation so as to remove said modulation. As is well understood, amplitude limiting is commonly employed to eliminate unwanted amplitude modulation from an FM signal.

Prior amplitude limiter systems are generally characterized in that they produce an ouput signal of substantially constant amplitude regardless of the average level of the input signal. Sometimes, however, it is desired to produce an output signal substantially free of amplitude modulation but proportional in average level to the average level of the input signal. For example, in one type of stereophonic system involving two stereophonic signals, which may be designated A and B, and also involving sum and difference signals $A+B$ and $A-B$, the sum signal is caused to amplitude-modulate a main carrier and the difference signal is caused to frequency-modulate a suppressed carrier in quadrature phase relation with the main carrier. Since the detected AM sum signal varies in average level according to the average level of the received signal, it is desirable that the detected FM difference signal shall do likewise. However, this result is not achieved with conventional devices which remove unwanted amplitude modulation from the FM signal but provide a substantially constant amplitude output signal.

The principal object of the present invention is to provide an improved amplitude limiter system which produces, in response to an input signal having unwanted amplitude modulation, an output signal which not only is substantially free of amplitude modulation but is also proportional in average level to the average level of the input signal.

In accordance with this invention, there is provided a system comprising a bridge circuit which produces, according to its degree of unbalance, an output signal substantially free of unwanted amplitude modulation of the input signal supplied to the bridge, and the system further comprises means for unbalancing the bridge according to the average level of the input signal, so that the average level of the output signal is proportional to the average level of the input signal. As hereinafter described, the unbalancing means may be external to the bridge circuit and connected thereto, or it may be within the bridge circuit.

In one form of the invention the bridge circuit comprises a pair of diodes which are caused to function in the manner of peak detectors, and provision is made for biasing one of the diodes according to the average level of the input signal.

In another form of the invention the bridge circuit comprises a pair of diodes which are caused to function cooperatively as a "middle slicer," i.e. to select a middle slice of the input signal, according to a bias supplied to one of the diodes which varies according to the average level of the input signal.

The invention may be fully understood from the following detailed description with reference to the accompanying drawings wherein FIG. 1 is a schematic illustration of one embodiment of the present invention;

Figure 1:
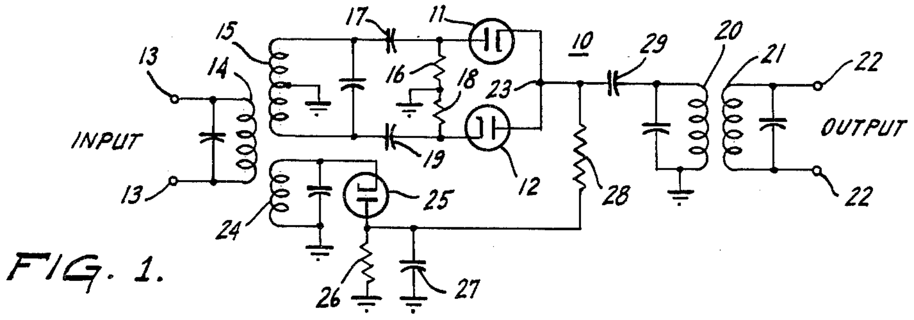

Referring first to FIG. 1, there is shown a bridge circuit 10 wherein a pair of oppositely-poled diodes 11 and 12 are connected in two parallel branches of the bridge circuit. The signal which may contain unwanted amplitude modulation is supplied to the bridge circuit via the input terminals 13 and input transformer windings 14 and 15 either or both of which may be tuned, the secondary winding 15 being center-tapped to ground. Associated with diode 11 are resistor 16 and capacitor 17, and similarly associated with diode 12 are resistor 18 and capacitor 19, the inner ends of the resistors being connected to ground. The two diode branches are connected to the tuned primary 20 of an output transformer, and the output signal is derived from the tuned secondary 21 by way of output terminals 22.

If no bias voltage were applied at point 23, the bridge circuit would be balanced and would remain so, and consequently there would be no output signal. However, a D.C. bias voltage is applied at point 23 according to the average level of the input signal, so that the bridge is unbalanced accordingly to produce an output signal whose average level is proportional to that of the input signal. In this embodiment, the input signal is also applied via tuned secondary 24 to a diode detector comprising diode 25 and its load resistor 26 which is shunted by a capacitor 27. The D.C. bias voltage developed across resistor 26 is applied through resistor 28 to point 23. A blocking capacitor 29 is provided to confine the bias voltage to said point. With proper adjustment of the bias voltage, the output signal will be substantially free of amplitude modulation for any depth of amplitude modulation of the input signal. Moreover, since the bias varies according to the average level of the input signal, the average level of the output signal varies accordingly.

Figure 2:
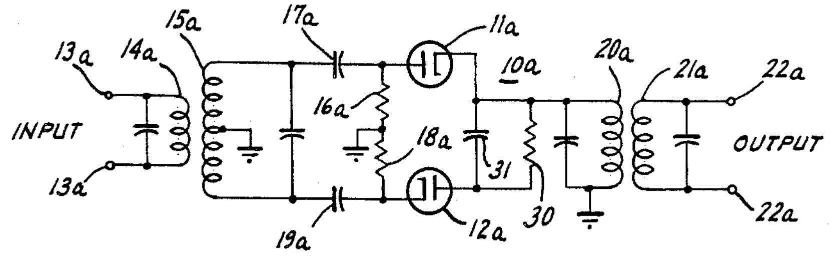
FIG. 2 is a schematic illustration of another embodiment of the invention.

Refering now to FIG. 2, the circuit there shown is similar to that of FIG. 1 except for the biasing means, and the elements corresponding to those of FIG. 1 are designated by the same reference numerals with the addition of the suffix "*a*." In the embodiment of FIG. 2, unbalance of the bridge circuit is effected by a biasing network comprising resistor 30 and capacitor 31 in the plate circuit of diode 12*a*. A negative bias is developed at the plate of diode 12*a*, which bias is proportional to the average level of the input signal and varies according to any change in said level.

Figure 3:
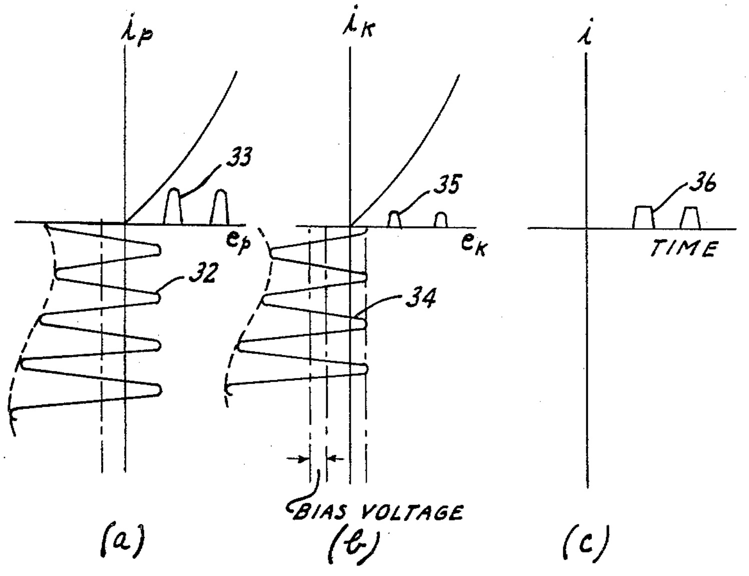
FIG. 3 is a graphic illustration of the operation of the embodiments shown in FIGS. 1 and 2.

The operation of the circuits shown in FIGS. 1 and 2 may be better understood with the aid of FIG. 3 which will be described with particular reference to FIG. 2. The diodes 11*a* and 12*a* and their associated RC networks 16*a*, 17*a* and 18*a*, 19*a* operate as peak detectors. FIG. 3(*a*) shows the conduction of diode 11*a* as a peak detector according to its plate voltage-plate current ($e_p-i_p$) characteristic. FIG. 3(*b*) shows the conduction of diode 12*a* as a peak detector according to its cathode voltage-cathode current ($e_k-i_k$) characteristic and the reduction of its conduction due to the bias developed by RC network 30, 31. The magnitude of current through each diode is determined by the charge on the associated capacitor that must be replaced due to the leakage through the associated resistor during each part of the input signal when the diode is out of conduction. The magnitude of curent through diode 12*a* is also determined by the bias and is decreased from that of diode 11*a* because of the bias. These currents flow in opposite directions through winding 20*a*. The resultant current is shown in FIG. 3(*c*).

As shown in FIG. 3(*a*), the input signal voltage 32 (assumed to be an FM signal having unwanted amplitude modulation) applied to diode 11*a* is leveled along its positive peaks by the peak detecting action, and current pulses 33 are produced by the conduction of the diode. As shown in FIG. 3(*b*) the input signal voltage 34 applied to diode 12*a* is also leveled along its positive peaks by the peak detector action, and current pulses 35 are produced by the conduction of the diode but such pulses are of smaller amplitude than pulses 33 due to the bias on diode 12*a*. The resultant pulses 36 shown in FIG. 3(*c*) represent the difference between pulses 33 and pulses 35. The output signal is a voltage wave which retains the frequency modulation of the input signal, is substantially free of amplitude modulation, and varies in average level according to the average level of the input signal.

The time constant of the RC networks 16*a*, 17*a* and 18*a* 19*a* must be long with respect to the carrier frequency and short with respect to the modulating frequency. The component values of the two RC networks are matched to within one percent tolerance in order to achieve adequate balance. Any degree of unbalance in the input transformer or in the diodes can be compensated, if necessary, by inserting a potentiometer between resistors 16*a* and 18*a* with the potentiometer tap grounded.

The time constant of the biasing RC network 30, 31 (and of the RC network 26, 27 in FIG. 1) must be long with respect to the modulating frequency. The amount of bias that is developed on the plate of diode 12*a* is dependent upon the level of the input signal and of the component values of resistor 30 and capacitor 31. Experimentation has shown that the time constant for adequate limiting of 80% modulation should be equal to or greater than 10 times the lowest modulating frequency.

Figure 4:
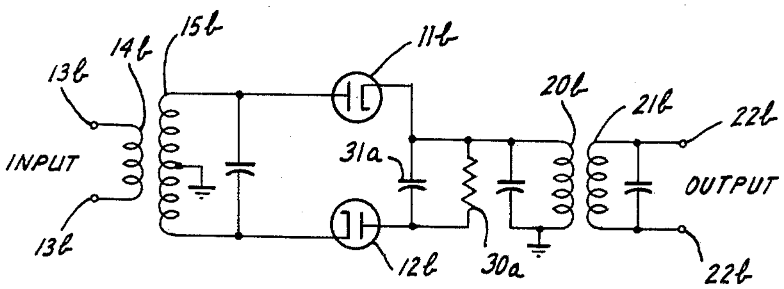
FIG. 4 is a schematic illustration of another embodiment of the invention.

Referring now to FIG. 4, the circuit there shown is similar to that of FIG. 2 except that the RC networks for the respective diodes have been eliminated so that the diodes do not operate as peak detectors. The elements in FIG. 4 are designated in correspondence to those of FIG. 2.

Figure 5:
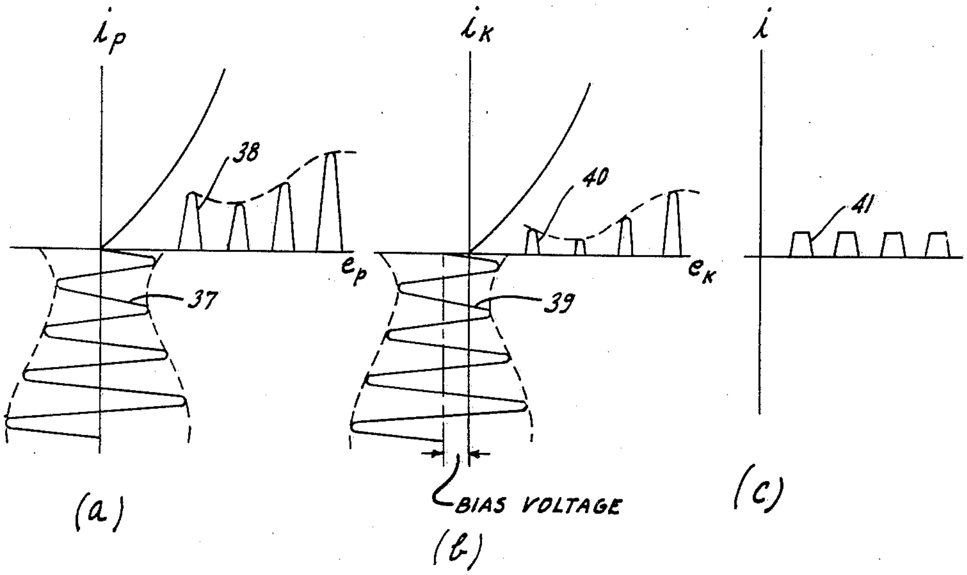
FIG. 5 is a graphic illustration of the operation of the embodiment shown in FIG. 4.

The circuit of FIG. 4 operates as a middle slicer as graphically illustrated in FIG. 5. FIG. 5(*a*) shows the input signal voltage 37 applied to diode 11*b* and the current pulses 38 produced by the conduction of the diode. FIG. 5(*b*) shows the input signal voltage 39 applied to the diode 12*b* and the current pulses 40 produced by the conduction of the diode which is reduced by the bias developed by the RC network 30*a*, 31*a*. The opposite flow of the diode currents in winding 20*b* results in the current pulses 41 shown in FIG. 5(*c*). The output signal is a voltage wave as in the embodiments of FIGS. 1 and 2. It will be seen from FIG. 5 that the circuit of FIG. 4 effectively slices out a middle portion of the input signal, and the width of the sliced out portion is determined by the bias developed by the RC network 30*a*, 31*a*. Since this bias varies according to the average level of the input signal, the average level of the output signal varies accordingly.

As in the circuit of FIG. 2, the time constant of the RC network 30*a*, 31*a* must be long with respect to the modulating frequency. Here again, the amount of bias that is developed on the plate of diode 12*b* is dependent upon the level of the input signal and of the component values of resistor 30*a* and capacitor 31*a*.

While certain embodiments of the invention have been illustrated and described, it will be understood that the invention is not limited thereto but contemplates such modifications and further embodiments as may occur to those skilled in the art.

I claim:

1. In an amplitude limiter system for producing, in response to an input signal having unwanted amplitude modulation, an output signal substantially free of amplitude modulation but proportional in average level to the average level of the input signal; a bridge circuit constructed to produce said output signal according to the degree of unbalance of the bridge circuit; means for supplying the amplitude-modulated input signal to said bridge circuit; and means for unbalancing said bridge circuit according to the average level of said input signal.

2. In an amplitude limiter system for producing, in response to an input signal having unwanted amplitude modulation, an output signal substantially free of amplitude modulation but proportional in average level to the average level of the input signal; a bridge circuit, including a pair of diodes, constructed to produce said output signal according to the degree of unbalance of the bridge circuit; means for supplying the amplitude-modulated input signal to said bridge circuit; and means for biasing one of said diodes to unbalance said bridge circuit according to the average level of said input signal.

3. An amplitude limiter system according to claim 2, wherein said biasing means is external to said bridge circuit and connected thereto.

4. An amplitude limiter system according to claim 3, wherein said biasing means comprises a diode detector to which said input signal is supplied and which is connected to said bridge circuit.

5. An amplitude limiter system according to claim 2, wherein said biasing means is within said bridge circuit.

6. An amplitude limiter system according to claim 5, wherein said biasing means comprises resistance and capacitance elements within said bridge circuit.

7. In an amplitude limiter system for producing, in response to an input signal having unwanted amplitude modulation, an output signal substantially free of amplitude modulation but proportional in average level to the average level of the input signal; a bridge circuit, comprising a pair of diodes and associated resistance and capacitance elements, constructed to produce said output signal according to the degree of unbalance of the bridge circuit; means for supplying the amplitude-modulated input signal to said bridge circuit; and means for unbalancing said bridge circuit according to the average level of said input signal.

8. In an amplitude limiter system for producing, in response to an input signal having unwanted amplitude modulation, an output signal substantially free of amplitude modulation but proportional in average level to the average level of the input signal; a bridge circuit, comprising a pair of diodes and associated resistance and capacitance elements, constructed to produce said output signal according to the degree of unbalance of the bridge circuit; means for supplying the amplitude-modulated input signal to said bridge circuit; and means for biasing one of said diodes to unbalance said bridge circuit according to the average level of said input signal.

9. An amplitude limiter system according to claim 8, wherein said biasing means comprises a diode detector to which said input signal is supplied and which is connected to said bridge circuit.

10. An amplitude limiter system according to claim 8, wherein said biasing means comprises resistance and capacitance elements within said bridge circuit.

11. In an amplitude limiter system for producing, in response to an input signal having unwanted amplitude modulation, an output signal substantially free of amplitude modulation but proportional in average level to the average level of the input signal; a bridge circuit, comprising a pair of oppositely-poled diodes in two parallel conductive branches and output means in a branch common to said parallel branches, for producing said output signal according to the degree of unbalance of the bridge circuit; means for supplying the amplitude-modulated input signal to said bridge circuit; and means for biasing one of said diodes to unbalance said bridge circuit according to the average level of said input signal, said biasing means comprising resistance and capacitance elements in one of said parallel branches.

12. In an amplitude limiter system, apparatus for effectively slicing out a middle portion of an input signal having unwanted amplitude modulation, comprising a pair of diodes each rendered conductive by a portion of the input signal of one polarity, means for biasing one of said diodes according to the average level of the input signal, whereby to render the current conducted by said one diode less than the current conducted by the other diode according to the magnitude of the bias, and means for deriving current representative of the difference between the currents conducted by the respective diodes.

13. In an amplitude limiter system, input transformer means including a secondary winding having a center tap connected to a point of fixed reference potential, output impedance means having one end connected to a point of the same fixed reference potential, a pair of parallel circuit branches connected respectively to the ends of said secondary winding and both connected to the other end of said impedance means, a pair of oppositely-poled diodes serially connected respectively in said circuit branches, means for supplying to said input transformer means a signal having unwanted amplitude modulation, and means for applying to one of said diodes a bias which is proportional to the average level of said input signal, whereby to produce across said impedance means a signal substantially free of amplitude modulation but proportional in average level to the average level of said input signal.

14. An amplitude limiter system according to claim 13, wherein said last means is external to said circuit branches and connected thereto.

15. An amplitude limiter system according to claim 14, wherein said means comprises a diode detector to which the input signal is supplied and which is connected to said circuit branches.

16. An amplitude limiter system according to claim 13, wherein said last means is included in one of said circuit branches.

17. An amplitude limiter system according to claim 16, wherein said means comprises parallel-connected resistance and capacitance elements included in one of said circuit branches.

18. An amplitude limiter system according to claim 13, further comprising means connected to each of said diodes for effecting peak detector action.

References Cited in the file of this patent

UNITED STATES PATENTS 2,600,051 Fay ---------------- June 10, 1952

2,854,570 Broverman ---------- Sept. 30, 1958